BISTABLE DEMODULATOR CIRCUIT

Filed Oct. 15, 1965

INVENTORS.
RODGER T. LOVRENICH
JAMES T. HARDIN
BY
Souther, Stoltenberg & Baker
ATTORNEYS United States Patent Office 3,388,267
Patented June 11, 1968

3,388,267
BISTABLE DEMODULATOR CIRCUIT

James T. Hardin and Rodger T. Lovrenich, Lambertville, Mich., assignors to Eltra Corporation, Toledo, Ohio, a corporation of New York Filed Oct. 15, 1965, Ser. No. 496,464
5 Claims. (Cl. 307—233)

This invention relates to a bistable demodulator device used for detecting and indicating the presence or absence of an oscillating input signal. More particularly, this invention relates to a solid state, bistable demodulation circuit which, when connected to an oscillating signal source, will detect and indicate, by the presence or absence of an output signal, whether or not oscillations are being received from said source, regardless of the amplitude and frequency of the input oscillations.

The uses of a bistable, on-off demodulator circuit which indicates the presence or absence of an oscillatory signal that is not dependent upon the amplitude and frequency of such signal are many. The output of such devices may be used to trigger other electronic circuits, or may be directly read upon an oscilloscope. The advantage of such a device is, of course, that the output or indicating signal is independent of the frequency or amplitude of the oscillating input signal and therefore such a device may be used to trigger other circuitry independently of the amplitude or frequency of the input signal.

The invention herein described includes a pair of transistors operably connected to a power supply in the familiar "Schmitt trigger" configuration with the addition of a RC time delay circuit connected to the collector of one transistor. The RC circuit is selected to have a time constant longer than the lowest frequency of the oscillatory signal to be detected, so that the output of the "Schmitt trigger" circuit will not follow the oscillations of the input signal, as would normally be expected. The output of the detector circuit including the RC circuit is bistable in that there is no output during the time that an input signal is being received and, during the time that there is no input signal, the capacitor of the RC circuit is charged to a substantial energy level and is discharged upon the initiation of an input signal.

It is an object of this invention to provide a solid state bistable detector and indicator circuit for indicating the presence or absence of an oscillating input signal by the presence or absence of an output signal, regardless of the amplitude or frequency of the input signal.

Other advantages, applications and modifications of the invention described herein will be apparent to those skilled in the art, from the following detailed description thereof, reference being made to the accompanying drawings in which.

Figure 1:
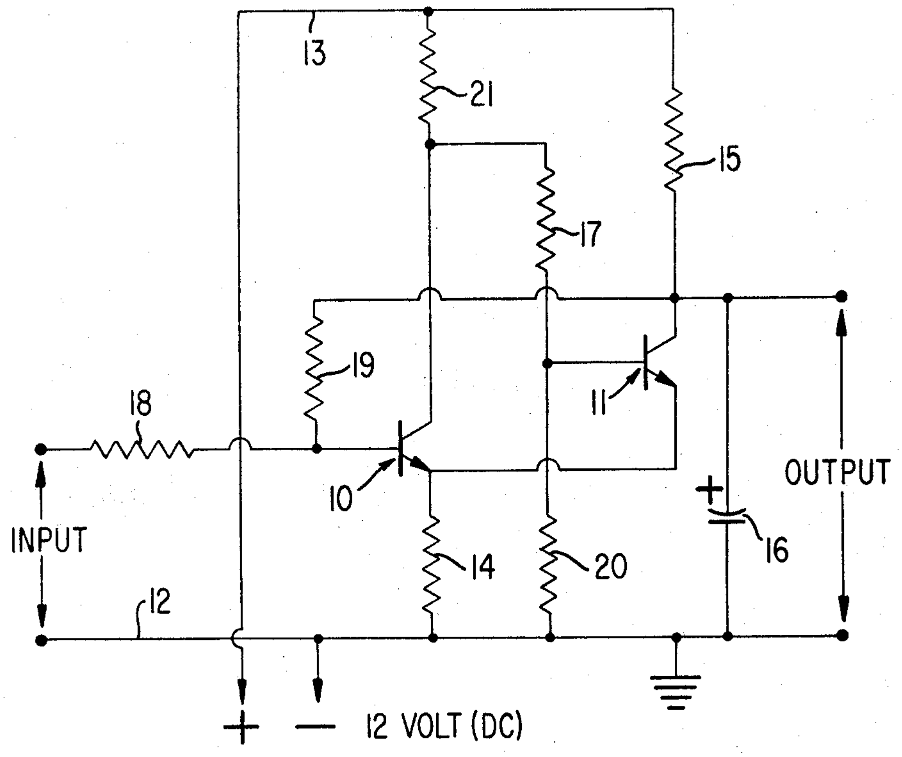
FIGURE 1 is a circuit diagram of a preferred embodiment of this invention, showing a pair of NPN type transistors operably connected across a low voltage direct current power supply, such as 12 volts, with a pair of input and output terminals operably connected thereto.

Referring first to FIGURE 1, a pair of NPN transistors 10 and 11 are connected across power supply lines 12 and 13 through a common emitter resistor 14. The transistors 10 and 11, as previously explained, form a modified "Schmitt trigger" circuit with the addition of an RC time delay circuit including a resistor 15 and a capacitor 16 connected in series with the collector of the transistor 11 connected between the resistor 15 and the capacitor 16.

One output terminal is directly connected to the collector of the transistor 11, and between the resistor 15 and the capacitor 16.

The collector of the transistor 10 is connected to the base of the transistor 11 through a resistor 17 and the base of the transistor 10 is connected to one input terminal through a resistor 18. The second input and output terminals are common with the power line 12, which is negative or at ground potential as shown in the preferred embodiment of FIGURE 1. The collector of the transistor 11 is connected to the base of the transistor 10 through a resistor 19 and the base of the transistor 11 is connected to ground 12 through a resistor 20.

The transistor 10 is biased by a resistor 21 between the power line 13 and its collector such that it is in a stable state of conduction when no input signal is being applied at its base through the resistor 18 from the input terminal. The output of the transistor 10 is applied to the base of the transistor 11 through the resistor 17 and holds it in a non-conducting or turned off condition. When the transistor 11 is turned off, the capacitor 16 is charged, through the resistor 15, to an initial energy level with polarity as indicated in FIGURE 1.

Figure 2:
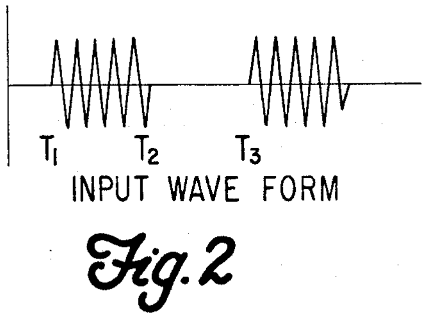
FIGURE 2 is a schematic illustration of the wave form of an oscillating signal which may be applied to the input terminals of FIGURE 1.

When an input or triggering signal is applied to the base of the transistor 10, such as the oscillating signal at time $T_1$ as schematically indicated in FIGURE 2, the transistor 10 is made non-conductive or turned off at this time. The transistor 11 starts to conduct and the energy stored in the capacitor 16 is immediately discharged to the output terminals and the sharp slope signal appears, similar to that shown in FIGURE 3 at time $T_1$.

While the "Schmitt trigger" circuit of the transistors 10 and 11 would normally be expected to follow the oscillating input applied to the base of the transistor 10, it is prevented from doing so by the time constant of the RC circuit comprising the resistor 15 and the capacitor 16 which prevents the complete recovery of the collector voltage of the transistor 11. Due to the high frequency of the input signal applied to the base of the transistor 10, relative to the RC circuit time constant, there is insufficient time available to substantially charge the capacitor 16 to its initial high energy level. Therefore, the energy discharge from this capacitor 16, after the initial discharge at time $T_1$, is very low while continuing oscillations are applied to the base of the transistor 10. Thus the signal at the collector of the transistor 11 and the output terminal, beween times $T_1$ and $T_2$, is very small in comparison with the signal just prior to time $T_1$.

Figure 3:
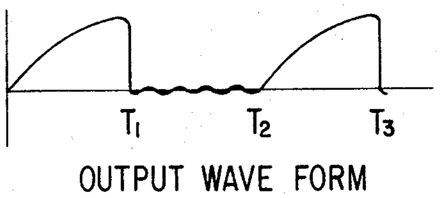
FIGURE 3 is a schematic diagram of the wave form of an output signal at the output terminals of FIGURE 1.

When the input oscillations applied to the base of the transistor 10 cease, as at time $T_2$, the charge on the capacitor 16 again begins to accumulate and reaches a substantial value, as shown in FIGURE 3, just prior to time $T_3$, and just prior to resumption of the oscillations and conduction by the transistor 11. The signal at the collector of the transistor 11 and the output terminals appears as periodic sharp voltage variations, reaching a maximum once just prior to each period of oscillation of the conductor detector circuit. Thus it is apparent that when there is no output signal, there is an oscillating input signal whose period is shorter than the time constant of the RC circuit. When the input signal stops, as at time $T_2$, transistor 11 remains off and the capacitor 16 is again charged to its initial high energy level.

The above described circuit effectively comprises a "Bistable Demodulator" which indicates, by a relatively large output signal, the absence of an oscillating signal impressed upon the input terminals and which indicates, by the absence of any appreciable output signal, that an oscillating signal is being applied to the input terminals.

Various modifications of the above described circuit, including the substitution of PNP type transistors for those shown in FIGURE 1 will be apparent to those skilled in the art. Other modifications can be made without departing from the scope and tenor of the accompanying claims.

We claim:

1. A bistable demodulator circuit for detecting the presence or absence of an oscillating input signal, comprising, in combination, a power supply, a first transistor having emitter, collector and control electrodes, with said control electrode operably connected to a signal input terminal and with the emitter-collector circuit of said first transistor connected to said power supply and biased such that said first transistor will conduct when no input signal is present, a second transistor having emitter, collector and control electrodes with said control electrode operably connected to the output of said first transistor and the emitter-collector circuit of said second transistor connected to the power supply and biased such that said second transistor will conduct only when said first transistor is non-conducting, an output terminal, an energy storage device operably connected to the output electrode of said second transistor and across said power supply whereby said energy storage device is charged during periods of non-conduction of said second transistor and whereby, when an input signal causes said first transistor to cease conducting thereby causing said second transistor to conduct, energy stored in said energy storage device is discharged, thus indicating at said output terminal the presence or absence of an input signal.

2. A bistable demodulator for detecting the presence or absence of an oscillating input signal, comprising, in combination, a power supply, a pair of NPN type transistors with their emitter-collector circuits connected across said power supply, signal input and a signal output terminals, said input terminals operatively connected to the control electrode of said first transistor and the collector of said first transistor operably connected to the control electrode of said second transistor, said transistors biased such that said first transistor will conduct only when no input signal is applied to its control electrode and said second transistor will conduct only when said first transistor is non-conducting, and an RC time delay circuit including a capacitor operatively connected between the collector of said second transistor, said output terminals and said power supply whereby said capacitor is substantially charged when said second transistor is non-conducting and is discharged at the time an input signal is applied to the control electrode of said first transistor, whereby the presence or absence of an input signal is indicated at the output terminals.

3. The demodulator of claim 2, wherein the time constant of said RC circuit is longer than the oscillation period of such oscillatory input whereby said capacitor does not become substantially charged when an input signal is present and whereby the energy discharged to said output terminals during such oscillating time is substantially less than the energy initially discharged from said capacitor when an input signal is initially applied to the control electrode of said first transistor.

4. The demodulator of claim 1 wherein said transistors are NPN type transistors with their emitter-collector circuits connected across said power source through a common emitter resistor.

5. A bistable demodulator circuit including a pair of transistors having emitter collector and, control electrodes, a power supply, a pair of input terminals and a pair of output terminals, said first transistor operably connected to said power supply with its control electrode operably connected to one of said input terminals whereby said first transistor is turned off when low voltage oscillations are applied to its control electrode from said input terminal, the second transistor biased across said power supply with its control electrode operably connected to the output of said first transistor whereby said second transistor will conduct only when said first transistor is non-conducting, a capacitor operably connected between one of said output terminals, the output of said second transistor and said power supply whereby said capacitor will be charged to a predetermined energy level when said second transistor is non-conducting and whereby said stored energy will be discharged to said output terminals when a signal at said input terminal turns off said first transistor and thus turns on said second transistor.

No references cited.

ALFRED L. BRODY, *Primary Examiner.*